United States Patent
Meier et al.

(10) Patent No.: US 9,506,810 B2
(45) Date of Patent: Nov. 29, 2016

(54) MEASURING TRANSDUCER HAVING TWO TRANSMISSION CHANNELS

(75) Inventors: Heinz W. Meier, Kalletal (DE); Fabian Zink, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 1016 days.

(21) Appl. No.: 13/805,316

(22) PCT Filed: Jun. 17, 2011

(86) PCT No.: PCT/EP2011/060139
§ 371 (c)(1),
(2), (4) Date: Nov. 7, 2013

(87) PCT Pub. No.: WO2011/157832
PCT Pub. Date: Dec. 22, 2011

(65) Prior Publication Data
US 2014/0222365 A1  Aug. 7, 2014

(30) Foreign Application Priority Data

Jun. 18, 2010 (DE) .................. 10 2010 017 465

(51) Int. Cl.
| | |
|---|---|
| *G06F 19/00* | (2011.01) |
| *G01K 1/00* | (2006.01) |
| *G01D 3/02* | (2006.01) |
| *G01K 7/21* | (2006.01) |

(52) U.S. Cl.
CPC ............. *G01K 1/00* (2013.01); *G01D 3/022* (2013.01); *G01K 7/21* (2013.01); *G01K 2219/00* (2013.01)

(58) Field of Classification Search
CPC ............ A61B 2560/0209; A61B 2562/222; A61B 5/0006
USPC ................ 702/130, 117, 118, 182–185
See application file for complete search history.

(56) References Cited

U.S. PATENT DOCUMENTS

| | | | |
|---|---|---|---|
| 5,390,153 A | * | 2/1995 | Scherbatskoy ..... E21B 41/0085 175/40 |
| 7,492,149 B2 | | 2/2009 | Motz et al. |

(Continued)

FOREIGN PATENT DOCUMENTS

| | | |
|---|---|---|
| DE | 3030990 | 4/1981 |
| DE | 9211664 | 12/1992 |

(Continued)

OTHER PUBLICATIONS

Russian Office Action—dated Apr. 21, 2014, 14 pages.

(Continued)

*Primary Examiner* — Edward Raymond
(74) *Attorney, Agent, or Firm* — Knobbe, Martens, Olson & Bear LLP

(57) ABSTRACT

The inventions herein include a measuring transducer, having a first transmission channel which conditions an analogue measurement input signal in an analogue manner and makes it available as a conditioned measurement signal. In addition, the measuring transducer may have a second transmission channel which conditions the analogue measurement input signal and makes it available as an influencing signal, wherein the conditioned measurement signal and the influencing signal are combined and made available as a measurement output signal. In a further embodiment of the inventions herein, a measuring system has a temperature sensor and a measuring transducer according to the present innovations.

20 Claims, 1 Drawing Sheet

(56) References Cited

U.S. PATENT DOCUMENTS

| | | |
|---|---|---|
| 8,754,631 B2 | 6/2014 | Watanabe et al. |
| 2005/0252314 A1 | 11/2005 | Vierkotter et al. |

FOREIGN PATENT DOCUMENTS

| | | |
|---|---|---|
| DE | 19652988 | 6/1998 |
| DE | 10 223 767 A1 | 5/2002 |
| DE | 10 2004 026 271 B3 | 12/2005 |
| GB | 1316498 | 5/1970 |
| SU | 1 366 978 A1 | 1/1988 |
| WO | 2009136428 A1 | 11/2009 |

OTHER PUBLICATIONS

International Search Report issued in PCT/EP2011/060139 on Jun. 27, 2012.

International Preliminary Report on Patentability and Written Opinion issued in PCT/EP2011/060139 on Dec. 19, 2012, 2012.

English Language Abstract of DE 3030990 published on Apr. 2, 1981.

English Language Abstract of DE 9211664 published on Dec. 10, 1992.

English Lanugage Abstract of DE 19652988 published on Jun. 25, 1998.

English Language Abstract of DE 19652988 published Jun. 25, 1998.

International Search Report for PCT/EP2011/060139 issued Jun. 27, 2012.

International Preliminary Report on Patentability and Written Opinion for PCT/EP2011/060139 issued Dec. 19, 2012 and Jun. 27, 2012, respectively.

Office Action received in Russian counterpart application No. 2012153372/28 (RU2012153372A), dated Aug. 29, 2014, 9 pages.

* cited by examiner

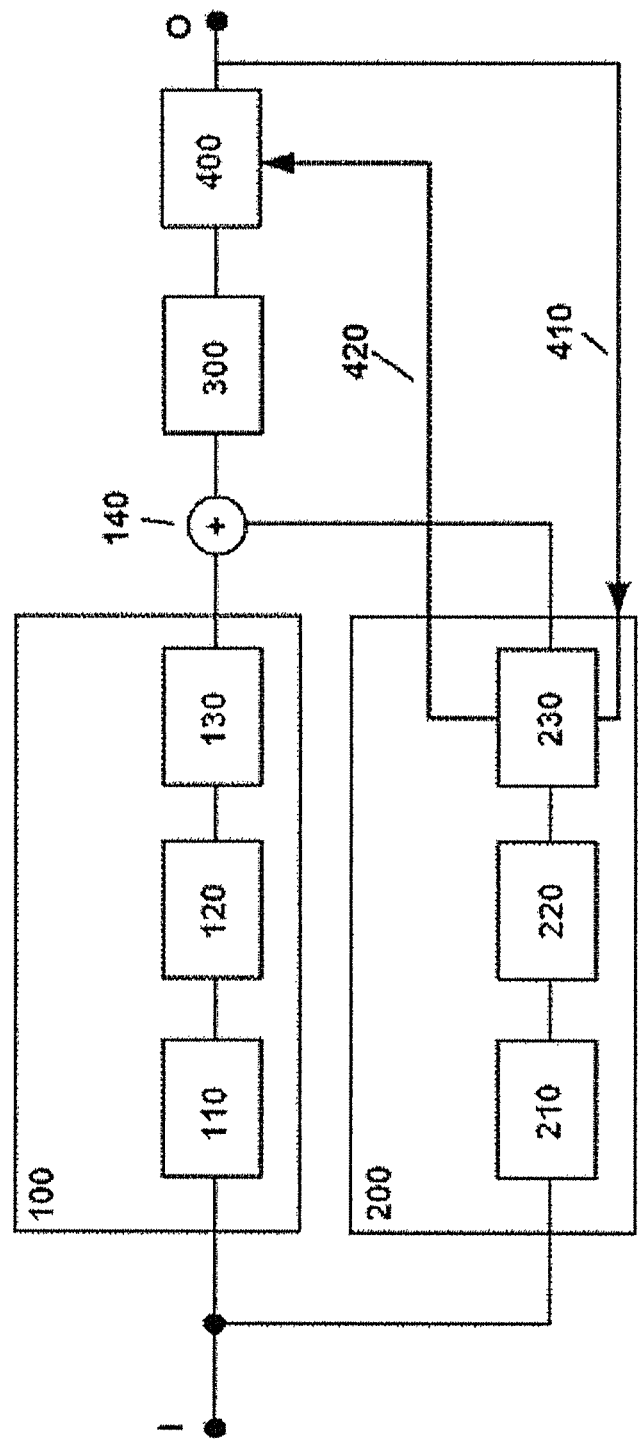

MEASURING TRANSDUCER HAVING TWO TRANSMISSION CHANNELS

CROSS REFERENCE TO RELATED APPLICATIONS

This application is a U.S. National Stage Application of International Application No. PCT/EP2011/060139, filed Jun. 17, 2011, published as WO/2011/157832, and which claims priority from German Patent Application No. 10 2010 017465.3, filed Jun. 18, 2010, The entirety of all of the above-listed applications are incorporated herein by reference.

The invention relates to a measuring transducer, particularly a measuring transducer having two transmission channels.

Measuring transducers are used in a very wide variety of applications. Their purpose is to convert an input signal from a measurement signal generator to a desired output signal. This is necessary whenever the generated measurement signal is incompatible with subsequent processing units.

In general, these measuring transducers are solely analog or solely digital in configuration.

In a digital configuration, the input measurement signal is converted by an analog-digital converter, under some circumstances is post-processed by a microcontroller, and is then converted back to an analog signal by a digital-analog converter.

In post-processing, a linearization is typically performed, so that non-linearities of the measurement signal generator and the analog-digital conversion are essentially no longer apparent in the output signal. This linearization can be based both on generally known physical properties and on measured parameters of the measurement signal generator and/ or of the digital measuring transducer.

The disadvantage of these digital measuring transducers is that they react relatively sluggishly, and therefore, response times to a step on the input side within the upper 100 ms range are observed.

In an analog configuration, the response times to a step on the input side are generally much shorter; however, in an analog configuration, implementing a linearization is much more difficult and much more costly.

The problem addressed by the invention is therefore that of providing a measuring transducer which solves one or more disadvantages of the prior art in an inventive manner.

To this end, the invention proposes a measuring transducer which comprises a first transmission channel, which conditions an analog measurement input signal in an analog manner and makes it available as a conditioned measurement signal. The measuring transducer further comprises a second transmission channel, which conditions the analog measurement input signal and makes it available as an influencing signal, wherein the conditioned measurement signal and the influencing signal are combined and made available as a measurement output signal.

In a further development of the invention, the second transmission channel conditions the analog measurement input signal in a digital manner.

In another further development of the invention, the first transmission channel has a modulator and a demodulator.

According to a further embodiment of the invention, the first transmission channel has a transformer.

According to another embodiment of the invention, the second transmission channel has an analog-digital converter and a digital-analog converter.

In a further development of the invention, the second transmission channel has an optoelectronic coupler.

In another further development of the invention, the second transmission channel has an arithmetic computing unit.

According to a further embodiment of the invention, the influencing signal contributes less than one-half, preferably +/−10 . . . 5%, to the measurement output signal.

According to yet another embodiment of the invention, the second transmission channel has a feedback of the measurement output signal for the purpose of comparing the measurement input signal with the measurement output signal.

According to a further embodiment of the invention, the feedback is embodied such that it can be disconnected.

In a further development of the invention, the analog measurement input signal is a temperature measurement input signal.

In a further embodiment of the invention, a measurement system comprises a temperature sensor and a measuring transducer according to the invention.

In what follows, the invention will be specified in greater detail in reference to FIG. 1. FIG. 1 shows a schematic illustration of a measuring transducer according to the invention.

FIG. 1 shows a measuring transducer according to the invention. Said measuring transducer has a first transmission channel 100 and a second transmission channel 200.

The first transmission channel 100 conditions an analog measurement input signal I from a measurement signal generator in an analog manner and makes it available as a conditioned measurement signal.

The second transmission channel 200 also conditions the analog measurement input signal I and makes it available as an influencing signal.

The conditioned measurement signal and the influencing signal are combined and made available as measurement output signal O.

In contrast to the first transmission channel 100, in which an analog measurement input signal I from a measurement signal generator is conditioned in an analog manner, the second transmission channel 200 conditions the analog measurement input signal I from the measurement signal generator in a digital manner.

In the analog branch of the measuring transducer, i.e., in the first transmission channel, a modulator 100 and a demodulator 200 can be provided for signal processing. Their purpose within the first transmission channel 100 is to convert a measurement input signal I from a measurement signal generator into a desired output signal. With the proper selection of the modulator 100 and the demodulator, the desired input regions of the measurement input signal I and the desired output regions can thereby be adjusted.

The first transmission channel 100 can further comprise a transformer 110. With the transformer 110, ratios can be converted, thereby allowing further adjustment of the desired input regions of measurement input signal I and the desired output regions, and with a suitable design, galvanic separation of the measurement input signal from subsequent processing steps can be achieved.

The second transmission channel 200 has an analog-digital converter 210 and a digital-analog converter 230. Their purpose within the first transmission channel 200 is that of converting a measurement input signal I from a measurement signal generator to a desired output signal. By properly selecting or programming the analog-digital converter 210 and/or the digital-analog converter 230, the desired input regions of the measurement input signal I and the desired output regions can be adjusted appropriately.

The second transmission channel 200 can also have an optoelectronic coupler, with which galvanic separation of the measurement input signal from subsequent processing steps can be achieved.

Furthermore, both analog-digital converter 210 and digital-analog converter 230 can have an arithmetic computing unit. This arithmetic computing unit can be used to perform a range conversion and a linearization, for example.

The output signal from the first transmission channel 100 and the output signal from the second transmission channel 200, called an influencing signal, are fed to a combining unit 140.

With this unit, the degree with which each of the signals flows into the combined measurement output signal O can be differently configured.

By embodying the first transmission channel 100 as an analog transmission channel and the second transmission channel 200 as a digital transmission channel, the respective advantages of both processing types can be utilized. The analog transmission channel enables a rapid response time, while a linearization and parameterization of component tolerances of both a measurement signal generator and the measuring transducer can be performed via the digital transmission channel.

In one advantageous embodiment, the ratio of the second transmission channel is low, i.e., the influencing signal contributes less than one-half, preferably +/−10 . . . 5%, to the measurement output signal.

If necessary, the measuring transducer can have an output stage 300 for amplifying the combined signal received via the combination unit 140.

In a further embodiment of the invention, the second transmission channel 200 can have a feedback 410 of the actual measurement output signal O for comparing the measurement input signal I with the actual measurement output signal O.

If a comparison indicates that the actual output signal O does not correlate to the desired degree to the measurement input signal I, then a switching stage 400 in the output branch of the measuring transducer can be controlled by means of a connection 420 so as to place the output signal in a safer state. This state can be predefined, for example, by SIL.

The switching stage 400 can be embodied, for example, as a transistor, wherein the connection 420 controls the gate or the base, etc.

The feedback 410 and the connection 420 can be designed such that they can be disconnected.

The output stage 300 can also optionally be switched by means of the feedback.

A comparison to indicate if the actual output signal O does not correlate to the desired degree to the measurement input signal I can then be carried out in both an analog and a digital manner.

If the comparison is conducted in a digital manner, the actual output signal O is subjected to analog-digital conversion before being processed. The measurement input signal I is already present digitally downstream of the analog-digital converter 210, therefore a comparison can be carried out at the proper location. This comparison can be carried out, for example, in an arithmetic computing unit 230 or in an arithmetic computing unit 210.

Although the individual components have been described as separate units, it is obvious to a person skilled in the art that this description is intended merely as an illustration of function and in no way represents a determination of a specific technical implementation. For instance, it is easily conceivable for the analog-digital converter 210 and an arithmetic computing unit to form a single functional unit. It is also conceivable for the analog-digital converter 210 and the digital-analog converter 230 to form a single functional unit.

Furthermore, the switching stage 400 and the output stage 300 can form a single functional unit.

As has already been stated, measuring transducers can be used in a very wide range of applications. Particularly preferable, however, is their use when the analog measurement input signal is a temperature measurement input signal.

Therefore, it is further proposed to provide a measurement system having a temperature sensor, e.g., a Pt100-sensot, and a measuring transducer according to the invention. In a measurement system of this type, by parameterization, a single adjustment can be made in the testing area, so that the overall system can be used for safety-related applications.

LIST OF REFERENCE SIGNS

First transmission channel 100
Modulator 110
Transformer 120
Demodulator 130
Combination unit 140
Second transmission channel 200
Analog-digital converter 210
Separation unit 220
Analog-digital converter 230
Output stage 300
Switching stage 400
Back-coupling 410
Switching connection 420

The invention claimed is:

1. A measuring transducer comprising:
a first transmission channel, which conditions an analog measurement input signal (I) in an analog manner and makes it available as a conditioned measurement signal; and
a second transmission channel, which conditions the analog measurement input signal (I) and makes it available as an influencing signal;
wherein the conditioned measurement signal and the influencing signal are combined and made available as a measurement output signal (0);and
wherein the first transmission channel and the second transmission channel are arranged in parallel, and both of the first transmission channel and the second transmission channel receive the analog measurement input signal as input.

2. The measuring transducer according to claim 1, wherein the second transmission channel conditions the analog measurement input signal in a digital manner.

3. The measuring transducer according to claim 1 wherein the first transmission channel has a transformer.

4. The measuring transducer according to claim 1, wherein the second transmission channel has an analog-digital converter and a digital-analog converter.

5. The measuring transducer according to claim 1, wherein the second transmission channel has an arithmetic computing unit.

6. The measuring transducer according to claim 1 wherein the first transmission channel has a modulator and a demodulator.

7. The measuring transducer according to claim 1 wherein the second transmission channel has an optoelectronic coupler.

8. The measuring transducer according to claim 1 wherein the influencing signal contributes less than one-half, preferably +/−10 . . . 5%, to the measuring output signal.

9. The measuring transducer according to claim 1 wherein the second transmission signal has a feedback of the measurement output signal (0) to allow comparison of the measurement input signal (I) with the measurement output signal (0).

10. The measuring transducer according to claim 9 wherein the feedback is designed such that it can be disconnected.

11. The measuring transducer according to claim 1 wherein the analog measurement input signal is a temperature measurement input signal.

12. A measuring system having a temperature sensor and a measuring transducer according to claim 1.

13. A measuring transducer comprising:
a first transmission channel, which conditions an analog measurement input signal (I) in an analog manner and makes it available as a conditioned measurement signal; and
a second transmission channel, which conditions the analog measurement input signal (I) and makes it available as an influencing signal;
wherein the conditioned measurement signal and the influencing signal are combined and made available as a measurement output signal (0); and
wherein the first transmission channel has a modulator and a demodulator.

14. A measuring transducer comprising:
a first transmission channel, which conditions an analog measurement input signal (I) in an analog manner and makes it available as a conditioned measurement signal; and
a second transmission channel, which conditions the analog measurement input signal (I) and makes it available as an influencing signal;
wherein the conditioned measurement signal and the influencing signal are combined and made available as a measurement output signal (0); and
wherein the second transmission channel has an optoelectronic coupler.

15. A measuring transducer comprising:
a first transmission channel, which conditions an analog measurement input signal (I) in an analog manner and makes it available as a conditioned measurement signal; and
a second transmission channel, which conditions the analog measurement input signal (I) and makes it available as an influencing signal;
wherein the conditioned measurement signal and the influencing signal are combined and made available as a measurement output signal (0); and
wherein the influencing signal contributes less than one-half, preferably +/−10 . . . 5%, to the measuring output signal.

16. A measuring transducer comprising:
a first transmission channel, which conditions an analog measurement input signal (I) in an analog manner and makes it available as a conditioned measurement signal; and
a second transmission channel, which conditions the analog measurement input signal (I) and makes it available as an influencing signal;
wherein the conditioned measurement signal and the influencing signal are combined and made available as a measurement output signal (0); and
wherein the second transmission signal has a feedback of the measurement output signal (0) to allow comparison of the measurement input signal (I) with the measurement output signal (0).

17. The measuring transducer according to claim 16, wherein the feedback is designed such that it can be disconnected.

18. The measuring transducer according to claim 16, wherein the second transmission channel conditions the analog measurement input signal in a digital manner.

19. A measuring transducer comprising:
a first transmission channel, which conditions an analog measurement input signal (I) in an analog manner and makes it available as a conditioned measurement signal; and
a second transmission channel, which conditions the analog measurement input signal (I) and makes it available as an influencing signal;
wherein the conditioned measurement signal and the influencing signal are combined and made available as a measurement output signal (0); and
wherein the analog measurement input signal is a temperature measurement input signal.

20. A measuring system, the system comprising:
a temperature sensor; and
a measuring transducer comprising:
a first transmission channel, which conditions an analog measurement input signal (I) in an analog manner and makes it available as a conditioned measurement signal; and
a second transmission channel, which conditions the analog measurement input signal (I) and makes it available as an influencing signal;
wherein the conditioned measurement signal and the influencing signal are combined and made available as a measurement output signal (0).

* * * * *